US012772128B2

(12) United States Patent
Li

(10) Patent No.: US 12,772,128 B2
(45) Date of Patent: Oct. 20, 2026

(54) CELL RESELECTION METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Xiaolong Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 326 days.

(21) Appl. No.: 18/294,473

(22) PCT Filed: Aug. 5, 2021

(86) PCT No.: PCT/CN2021/110984
§ 371 (c)(1),
(2) Date: Feb. 1, 2024

(87) PCT Pub. No.: WO2023/010443
PCT Pub. Date: Feb. 9, 2023

(65) Prior Publication Data
US 2024/0349147 A1 Oct. 17, 2024

(51) Int. Cl.
*H04W 36/08* (2009.01)
*H04W 36/24* (2009.01)
*H04W 84/06* (2009.01)

(52) U.S. Cl.
CPC ....... *H04W 36/083* (2023.05); *H04W 36/085* (2023.05); *H04W 36/249* (2023.05); *H04W 84/06* (2013.01)

(58) Field of Classification Search
CPC ............. H04W 36/083; H04W 36/085; H04W 36/249; H04W 84/06; H04W 48/20; H04W 48/08
USPC .......................................................... 455/429
See application file for complete search history.

(56) References Cited

U.S. PATENT DOCUMENTS

2021/0068013 A1 3/2021 Cheng
2022/0046504 A1* 2/2022 Shrestha ............... H04W 36/06

FOREIGN PATENT DOCUMENTS

CN 111132254 A 5/2020

OTHER PUBLICATIONS

ZTE corporation, Sanechips, "Report from [Post113bis-e] [101] [NTN] cell reselection (ZTE)", 3GPP TSG-RAN WG2 Meeting #114-e, R2-2104805, Online, May 19-27, 2021, 23 pages.
Xiaomi, "Enhancements on cell selection/reselection for earth moving and fixed beams", 3GPP TSG RAN WG2 #113, R2-2100811, e-Meeting, Jan. 25-Feb. 5, 2021, 3 pages.
Xiaomi, "Cell selection and reselection enhancements for NTN", 3GPP TSG RAN WG2 #113bis, R2-2103135, e-Meeting, Apr. 12-20, 2021, 8 pages.
International Search Report of International Application No. PCT/CN2021/110984, dated Apr. 28, 2022, 4 pages.
Extended European Search Report Issued in Application No. 21952332.1 dated Nov. 27, 2024, 14 pages.

(Continued)

*Primary Examiner* — Huy C Ho
(74) *Attorney, Agent, or Firm* — Finnegan, Henderson, Farabow, Garrett & Dunner, L.L.P.

(57) ABSTRACT

A cell reselection method is performed by a user equipment (UE), The method includes: receiving time information; and determining a cell reselection moment according to the time information and a cell reselection status.

28 Claims, 4 Drawing Sheets

(56) References Cited

OTHER PUBLICATIONS

"Report from [113bis-e][107][NTN] CHO aspects (Nokia)", Nokia, Nokia Shanghai Bell, 3GPP TSG-RAN WG2 Meeting #113bis-e, R2-2104366, Elbonia, Online, Apr. 12-20, 2021, 20 pages.
"Report from [113-e][105][NTN] Idle mode aspects (Nokia)", Nokia, Nokia Shanghai Bell, 3GPP TSG-RAN WG2 Meeting #113, R2-2102015, Elbonia, Online, Jan. 25-Feb. 5, 2021, 23 pages.

* cited by examiner

CELL RESELECTION METHOD AND APPARATUS, COMMUNICATION DEVICE, AND STORAGE MEDIUM

CROSS-REFERENCE TO RELATED APPLICATION

The application is a U.S. National Stage of International Application No. PCT/CN2021/110984 filed on Aug. 5, 2021, the entire content of which is incorporated herein by reference.

TECHNICAL FIELD

The present disclosure relates to, but it not limited to, the technical field of communication, and in particular, relates to a cell reselection method, apparatus, communication device and storage medium.

BACKGROUND

In the related art, the fifth-generation mobile communication (5G) introduces Non-terrestrial networks (NTN). When a satellite performs link switch, etc., it may cause UEs in the cell to perform cell reselection. When the link is switched, the base station (gNB) may be suddenly unavailable.

SUMMARY

Embodiments of the present disclosure provide a cell reselection method, apparatus, communication device, and storage medium.

According to the first aspect of the embodiments of the present disclosure, there is provided a cell reselection method, performed by a UE, including:

receiving time information; and determining a cell reselection moment according to the time information and a cell reselection status.

According to the second aspect of the embodiments of the present disclosure, there is provided a cell reselection method, performed by a network device, including:

sending time information: where the time information and a cell reselection status are used for a UE to determine a cell reselection moment.

According to a third aspect of the embodiments of the present disclosure, there is provided a cell reselection apparatus, applied to a UE, including:

a receiving module, configured to receive time information; and a determination module, configured to determine a cell reselection moment according to the time information and a cell reselection status.

According to a fourth aspect of the embodiments of the present disclosure, there is provided a cell reselection apparatus, applied to a network device, including:

a sending module, configured to send time information; where the time information and a cell reselection status are used for a UE to determine a cell reselection moment.

According to a fifth aspect of the embodiments of the present disclosure, there is provided a communication device, including:

a processor; and a memory for storing executable instructions of the processor:

where the processor is configured to implement the cell reselection method in any embodiment of the present disclosure when running the executable instructions.

According to a sixth aspect of the embodiments of the present disclosure, a computer storage medium is provided, where the computer storage medium stores a computer executable program, and when the executable program is executed by a processor, the cell reselection method in any embodiment of the present disclosure is implemented.

The technical solutions provided by the embodiments of the present disclosure may include the following beneficial effects.

In the embodiments of the present disclosure, the time information may be received by the UE: the cell reselection moment may be determined according to the time information and the cell reselection status: thus, the UE can start to perform cell reselection at the cell reselection moment. In this way, compared with the cell reselection based on the signal measurement result of the serving cell in the related art, the embodiments of the present disclosure can reduce the situation that the serving cell of the UE is unavailable and the measurement of the neighbor cell is not started, so that the UE can determine the cell reselection moment earlier and faster only according to the pre-received time information and cell reselection status without the measurement result of the serving cell: thereby reducing the situation that the cell reselection process is slow due to that the determination of the cell reselection moment is untimely or undetermined when actually needing for cell reselection. Moreover, it can also reduce the situation that the UE cannot be covered by the wireless signal due to the movement of the serving cell during the cell reselection process, and improve the success rate of cell reselection.

It should be understood that both the foregoing general description and the following detailed description are exemplary and explanatory only, and are not intended to limit the embodiments of the present disclosure.

DETAILED DESCRIPTION

Reference will now be made in detail to the embodiments, examples of which are illustrated in the accompanying drawings. When the following description refers to the accompanying drawings, the same numerals in different drawings refer to the same or similar elements unless otherwise indicated. The implementations described in the following embodiments do not represent all implementations consistent with the embodiments of the present disclosure. Rather, they are merely examples of apparatuses and methods consistent with aspects of the disclosed embodiments as recited in the appended claims.

Terms used in the embodiments of the present disclosure are for the purpose of describing specific embodiments only, and are not intended to limit the embodiments of the present disclosure. As used in the embodiments of the present disclosure and the appended claims, the singular forms "a" and "the" are also intended to include the plural unless the context clearly dictates otherwise. It should also be understood that the term "and/or" as used herein refers to and includes any and all possible combinations of one or more of the associated listed items.

It should be understood that although the embodiments of the present disclosure may use the terms first, second, third, etc. to describe various information, the information should not be limited to these terms. These terms are only used to distinguish information of the same type from one another. For example, without departing from the scope of the embodiments of the present disclosure, first information may also be called second information, and similarly, second information may also be called first information. Depending on the context, the word "if" as used herein may be interpreted as "in time of . . . " or "when" or "in response to a determination."

Figure 1:
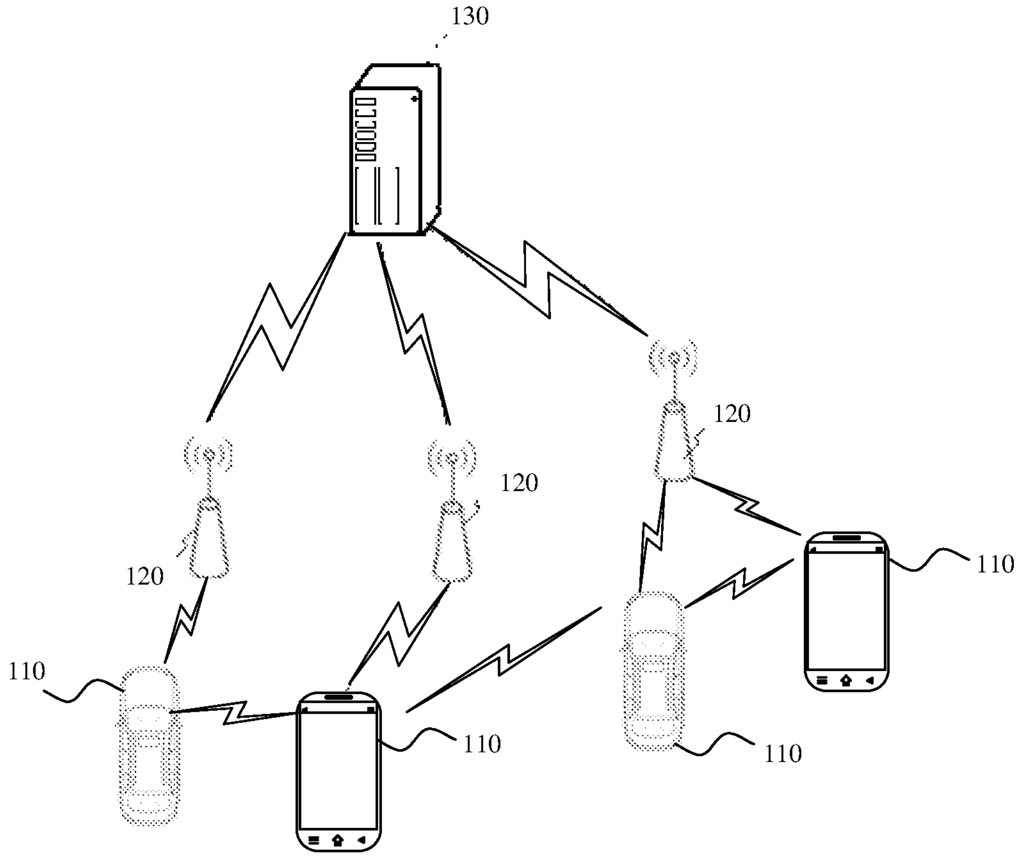
FIG. 1 is a schematic structural diagram of a wireless communication system according to an embodiment of the present disclosure.

FIG. 1 is referred to, which shows a schematic structural diagram of a wireless communication system provided by an embodiment of the present disclosure. As shown in FIG. 1, the wireless communication system is a communication system based on cellular mobile communication technology, and the wireless communication system may include: several user equipments 110 and several base stations 120.

The user equipment 110 may be a device that provides voice and/or data connectivity to the user. The user equipment 110 can communicate with one or more core networks via a Radio Access Network (RAN), and the user equipment 110 can be an Internet of Things user equipment, such as a sensor device, a mobile phone (or called a "cellular" phone) and a computer with IoT user equipment, for example, it can be a fixed, portable, pocket, hand-held, computer built-in or vehicle-mounted apparatus, such as a Station (STA), a subscriber unit, a subscriber station, a mobile station, a mobile, a remote station, an access point, a remote user equipment (remote terminal), an access user equipment (access terminal), a user apparatus (user terminal), a user agent, a user device, or a user equipment. Alternatively, the user equipment 110 may also be a device of an unmanned aerial vehicle. Alternatively, the user equipment 110 may also be a vehicle-mounted device, for example, a trip computer with a wireless communication function, or a wireless user device connected externally to the trip computer. Alternatively, the user equipment 110 may also be a roadside device, for example, may be a street lamp, a signal lamp, or other roadside devices with a wireless communication function.

The base station 120 may be a network side device in a wireless communication system. The wireless communication system may be a fourth generation mobile communication technology (the 4th generation mobile communication, 4G) system, also known as a Long Term Evolution (LTE) system: or, the wireless communication system may also be a 5G system, also known as a new air interface system or 5G NR system. Alternatively, the wireless communication system may also be a next-generation system of the 5G system. Among them, the access network in the 5G system can be called the New Generation-Radio Access Network (NG-RAN).

The base station 120 may be an evolved base station (eNB) adopted in the 4G system. Alternatively, the base station 120 may also be a base station (gNB) adopting a centralized and distributed architecture in the 5G system. When the base station 120 adopts the centralized and distributed architecture, it generally includes a central unit (CU) and at least two distributed units (DUs). The central unit is provided with protocol stacks of a Packet Data Convergence Protocol (PDCP) layer, a Radio Link Control (RLC) layer, a Medium Access Control (MAC) layer; and a protocol stack of a physical (PHY) layer is provided in the distributed unit. The embodiments of the present disclosure do not limit the specific implementations of the base station 120.

A wireless connection may be established between the base station 120 and the user equipment 110 through a wireless air interface. In different implementations, the wireless air interface is a wireless air interface based on the fourth-generation mobile communication network technology (4G) standard: or, the wireless air interface is a wireless air interface based on the fifth-generation mobile communication network technology (5G) standard, for example, the wireless air interface is a new air interface: alternatively, the wireless air interface may also be a wireless air interface based on a technical standard of a next-generation mobile communication network based on 5G.

In some embodiments, an End to End (E2E) connection may also be established between the user equipments 110, such as scenes like vehicle to vehicle (V2V) communication, vehicle to Infrastructure (V2I) communication and vehicle to pedestrian (V2P) communication in the vehicle to everything (V2X) communication.

Here, the above user equipment may be regarded as the terminal device in the following embodiments.

In some embodiments, the foregoing wireless communication system may further include a network management device 130.

Several base stations 120 are connected to the network management device 130 respectively. The network management device 130 may be a core network device in the wireless communication system, for example, the network management device 130 may be a Mobility Management Entity (MME) in an Evolved Packet Core (EPC). Alternatively, the network management device can also be other core network devices, such as a Serving GateWay (SGW), a Public Data Network GateWay (PGW), a Policy and Charging Rules Function (PCRF) or a Home Subscriber Server (HSS), etc. The implementation form of the network management device 130 is not limited in the embodiments of the present disclosure.

In order to better understand the technical solutions described in any embodiment of the present disclosure, first, a partial description of cell reselection in the related art is given.

In an application scenario, in the NTN network, if the satellite performs a feeder link switch or the UE performs a service link switch, it may cause the UE to perform cell reselection. The base station may be suddenly unavailable during the feeder link switch: if the UE starts the measurement of the neighboring cell according to the S criterion, the situation that the measurement of the neighboring cell is started but the serving cell is suddenly unavailable may occur: which may cause the UE to perform cell reselection too late.

In an embodiment, the network types supported by the NTN network include: an earth moving type, an earth fixed type or a quasi earth fixed type. In the case of these network types, how the UE determines the cell reselection moment is an urgent problem to be solved.

Figure 2:
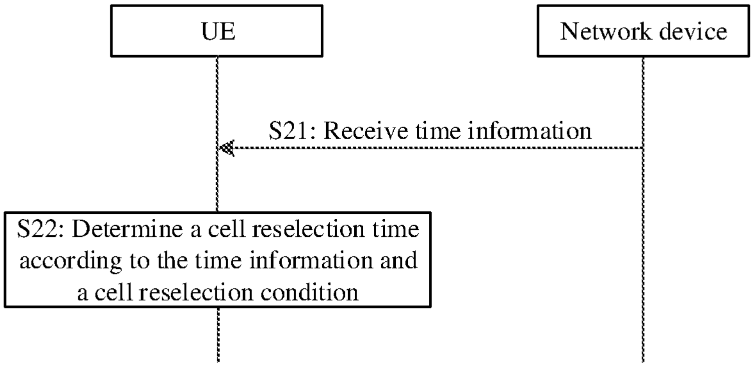
FIG. 2 is a flowchart showing a cell reselection method according to an embodiment of the present disclosure.

As shown in FIG. 2, an embodiment of the present disclosure provides a cell reselection method, which is performed by a UE, including the following steps.

In step S21: time information is received.

In step S22: a cell reselection moment is determined according to the time information and a cell reselection status.

In an embodiment, the UE may be various mobile terminals or fixed terminals. For example, the UE may be, but not limited to, a mobile phone, a computer, a server, a wearable device, a game control platform, or a multimedia device.

An embodiment of the present disclosure provides a cell reselection method, executed by a UE, which may include: receiving time information sent by a network device.

In an embodiment, the network device may be an NTN network device. Exemplarily, the network device may include but not limited to one of the following: a satellite, a base station, a core network device, and so on. The base station here may be a 3G base station, a 4G base station, a 5G base station or other evolved base stations. Here, the core network device may be, but not limited to, various physical or logical entities of the core network: for example, the core network device may be a mobility management entity or a serving gateway.

In an embodiment, the time information may be time information of Coordinated Universal Time (UTC). In other embodiments, the time information may also be ephemeris reference time, Beijing time, and the like.

The time information may be a reselection moment indicating the UE to perform a certain or a plurality of reselection status.

In an embodiment, the cell reselection moment is a moment when the UE starts to measure the neighboring cell.

In an embodiment, the cell reselection status includes but not limited to at least one of the following:

a network type:

an application scenario involved in the time information.

The network type here may refer to a network type of the serving cell of the UE.

In an embodiment, the network type includes but is not limited to one of the following:

- an earth moving type, indicating a type of NTN network where an area covered by a satellite beam on the earth moves;
- an earth fixed type, indicating a type of NTN network where the area covered by the satellite beam on the earth is fixed:
- a quasi earth fixed type, indicating a type of NTN network where a first area covered by the satellite beam on the earth is fixed within a predetermined time, and the satellite beam covers a second area on the earth when the predetermined time is reached.

For example, the geostationary satellite may refer to a form of the earth fixed type.

Here, the movement of the area covered by the satellite beam on the earth can also be regarded as the movement of the area covered by the satellite signal on the earth relative to the predetermined position on the ground. Here, the area covered by the satellite beam on the earth being fixed may also be regarded as that the area covered by the satellite signal on the earth is stationary relative to the predetermined position on the ground. Here, the first area covered by the satellite beam on the earth being fixed within the predetermined time and the satellite beam covering the second area on the earth when the predetermined time is reached can also be considered as: the area covered by the satellite signal on the earth is stationary relative to the predetermined position on the ground within the predetermined time, and the area covered by the satellite signal on the earth moves relative to the ground position after the predetermined time. Here, the area covered by the satellite beam on the earth or the area covered by the satellite signal on the earth may be regarded as the area covered by the serving cell of the UE.

For example, the UE may receive the time information. At this time, if the current serving cell of the UE is an NTN network of the earth moving type, the UE may determine the cell reselection moment of the NTN network of the earth moving type according to the time information: if the current serving cell of the UE is an NTN network of the earth fixed type, the UE may determine the cell reselection moment of the NTN network of the earth fixed type according to the time information.

In an embodiment, the application scenario includes but is not limited to one of the following:

- a cell reselection scenario triggered by a service link switch:
- a cell reselection scenario triggered by a feeder link switch.

The service link here may refer to a link between the UE and a satellite or a base station. The feeder link here may refer to a link between a base station or a satellite and a core network, or between a base station or a satellite and a satellite gateway.

In the disclosed embodiments of the present disclosure, the UE can determine the cell reselection moment based on the time information and the cell reselection status, so as to perform cell reselection based on the reselection moment. In this way, compared with the cell reselection based on the signal measurement result of the serving cell in the related art, the embodiments of the present disclosure can reduce the situation that the serving cell of the UE is unavailable and the measurement of the neighbor cell is not started, so that the UE can determine the cell reselection moment earlier and faster only according to the pre-received time information and cell reselection status without the measurement result of the serving cell: thereby reducing the situation that the cell reselection process is slow due to that the determination of the cell reselection is untimely or undetermined when actually needing for cell reselection. Moreover, it can also reduce the situation that the UE cannot be covered by the wireless signal due to the movement of the serving cell during the cell reselection process, and improve the success rate of cell reselection.

In an embodiment, the network type and/or application scenario is determined based on a field of a received first message carrying the time information.

In an embodiment, when the time information is carried in different fields of the first message, it indicates that the network types are different and/or the application scenarios relating to the time information are different.

An embodiment of the present disclosure provides a cell reselection method, performed by a UE, which may include: receiving a first message, where the first message carries the time information. Exemplarily, the first message includes but is not limited to a system message and a radio resource control (RRC) signaling.

An embodiment of the present disclosure provides a cell reselection method, performed by a UE, which may include: receiving a first message; where a first predetermined field of the first message carries the time information, indicating that the network type is the earth moving type and/or the time information involves a cell reselection scenario triggered by the feeder link switch.

An embodiment of the present disclosure provides a cell reselection method, performed by a UE, which may include: receiving a first message: where a second predetermined field of the first message carries the time information, indicating that the network type is the quasi earth fixed type and/or the time information relates to a cell reselection scenario triggered by the service link switch.

In this way, in the embodiments of the present disclosure, different network types and/or application scenarios can be indicated by carrying the time information in different fields in the first message; thus, the UE only needs to receive the first message carrying the time information, and can know the time information configured by the network and the cell reselection status; thus, the transmission of signaling can be reduced and the system resource can be saved.

In an embodiment, the network type and/or application scenario is determined based on received indication information. Exemplarily, the indication information may also be sent through a system message or RRC signaling. The indication information here is not carried in the first message; that is, the system message carrying the indication information and the first message carrying the time information are not the same message, or the RRC signaling carrying the indication information and the first message carrying the time information are not the same message.

In an embodiment, the indication information includes type indication information; and the type indication information includes one of the following:

first type indication information used to indicate that the network type is an earth moving type:

second type indication information used to indicate that the network type is an earth fixed type:

third type indication information used to indicate that the network type is a quasi earth fixed type.

In an embodiment, the indication information includes switch indication information: where the switch indication information includes one of the following:

first switch indication information used to indicate that the time information relates to a cell reselection scenario triggered by service link switch;

second switch indication information used to indicate that the time information relates to a cell reselection scenario triggered by feeder link switch.

In this way, in the embodiments of the present disclosure, the network type of the current network and/or the application scenario involved in the time information can be determined through the indication information received by the UE; thus, an accurate cell reselection status can be determined.

A cell reselection method provided by an embodiment of the present disclosure is performed by a UE, and may include: if the indication information does not include the switch indication information, the time information relates to the cell reselection scenario triggered by service link switch and the cell reselection scenario triggered by feeder link switch.

Exemplarily, if the UE receives the indication information, where the indication information only includes the first type indication information; then the UE determines that the serving cell where the UE is located is of an earth moving type, and the time information may involve the cell reselection scenario triggered by the service link switch, or may also involve the cell reselection scenario triggered by the feeder link switch.

In this way, in the embodiments of the present disclosure, if the indication information does not carry the switch indication information, the application scenario involved in the time information may also be determined through no indication.

In an embodiment, if the serving cell of the UE is of the earth moving type, one serving cell is associated with one or two pieces of the time information.

Exemplarily, the serving cell of the UE is of the earth moving type. If one serving cell is associated with one piece of time information: the time information may be related to a cell reselection scenario triggered by service link switch, or the time information may be related to a cell reselection scenario triggered by feeder link switch. If the time information relates to the cell reselection scenario triggered by the feeder link switch, the time information may be used by all UEs in the serving cell for cell reselection.

In an embodiment, if one serving cell is associated with two pieces of time information, one piece of the time information relates to the cell reselection scenario triggered by service link switch, and the other of the time information relates to the cell reselection scenario triggered by feeder link switch.

Exemplarily, the serving cell of the UE (that is, the network type of the network where the UE is located) is an earth moving type. If one serving cell is associated with two pieces of time information: one piece of the time information relates to the cell reselection scenario triggered by service link switch, and the other piece of the time information relates to the cell reselection scenario triggered by feeder link switch. If the other of the time information relates to the cell reselection scenario triggered by feeder link switch, this time information can be used by all UEs in the serving cell for cell reselection.

Since the service link is the link between the UE and the satellite or the base station, if the scenario of cell reselection triggered by service link switch is involved, the UEs of one serving cell may be associated with different time information, so that each UE can determine the respective cell reselection moments based on the respective time information. Since the feeder link refers to the link between the base station or satellite and the core network: if the cell reselection scenario triggered by the feeder link switch is involved, all UEs in one serving cell may be associated with the same time information; and the time information can be used by all UEs in the serving cell to determine the cell reselection moment.

In an embodiment, if the serving cell of the UE is of a quasi earth fixed type, one serving cell is associated with one piece of time information.

Exemplarily, the serving cell of the UE (that is, the network type of the network where the UE is located) is a quasi earth fixed type, one serving cell is associated with one piece of time information: the time information may involve a cell reselection scenario that may be triggered by service link switch, or a cell reselection scenario triggered by feeder link switch: the time information can be used by all UEs in the serving cell to determine the cell reselection moment.

Exemplarily, the UE may receive time information broadcast by the network device.

Since the network where the UE is located is of a quasi earth fixed type: during the reselection process of the UE, the serving cell will not move or will not move within a predetermined time: the time information for a certain serving cell can be applied to all UEs in the serving cell.

In this way, when the serving cell of the UE is of a quasi earth fixed type, one piece of time information can be associated with one serving cell; thus all UEs in the serving cell can determine the cell reselection moment based on the time information; which can reduce the transmission resource for transmitting the time information in one serving cell.

It should be noted that those skilled in the art can understand that the methods provided in the embodiments of the present disclosure may be executed independently, or together with some methods in the embodiments of the present disclosure or some methods in the related art.

Figure 3:
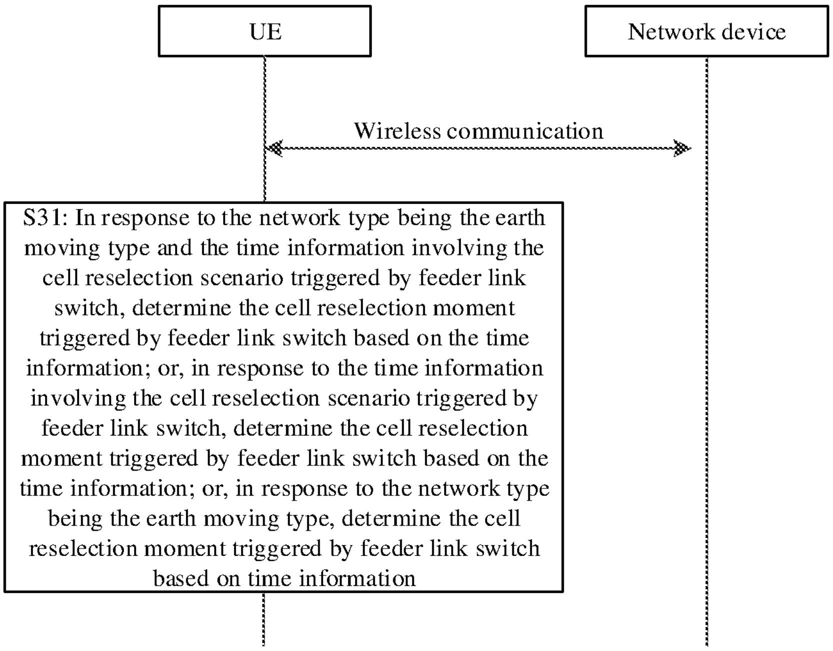
FIG. 3 is a flowchart showing a cell reselection method according to an embodiment of the present disclosure.

As shown in FIG. 3, an embodiment of the present disclosure provides a cell reselection method, which is performed by a UE, including the following steps.

In step S31: in response to the network type being the earth moving type and the time information involving the cell reselection scenario triggered by feeder link switch, the cell reselection moment triggered by feeder link switch is determined based on the time information: or, in response to the time information involving the cell reselection scenario triggered by feeder link switch, the cell reselection moment triggered by feeder link switch is determined based on the time information: or, in response to the network type being the earth moving type, the cell reselection moment triggered by feeder link switch is determined based on the time information.

In some embodiments of the present disclosure, the time information may be the time information in step S21: the cell reselection status may be the cell reselection status in step S22: the network type may be the network type in the above embodiments: the application scenario involved in the time information may be the application scenario involved in the time information in the above embodiments.

In an embodiment, the cell reselection moment may be a moment when the UE starts to measure the neighboring cell.

In an embodiment, the neighboring cell includes but is not limited to one of the following: a cell that can be searched by the UE, a neighboring cell stored in historical information of the UE, or a neighboring cell configured for the UE by a network device.

Exemplarily, the UE determines that the type of the network where the UE is located is an earth moving type, and determines that the received time information only involves the cell reselection scenario triggered by the feeder link switch; then the UE determines the cell reselection moment triggered by the feeder link switch based on the time information. Then the UE starts to perform a cell reselection operation at the cell reselection moment, such as performing measurement of the neighboring cell.

Exemplarily, the UE determines that the time information received by the UE only involves the cell reselection scenario triggered by the feeder link switch, and then the UE determines the cell reselection moment triggered by the feeder link switch based on the time information. Then the UE starts to perform a cell reselection operation at the cell reselection moment, such as performing measurement of the neighboring cell.

Exemplarily, the UE determines that the type of the network where the UE is located is an earth moving type, then the UE determines the cell reselection moment triggered by the feeder link switch based on the received time information, and then the UE starts the cell reselection operation at the cell reselection moment, such as the measurement of the neighboring cell.

In an embodiment, determining the cell reselection moment triggered by the feeder link switch based on the time information may be: determining the time information as the cell reselection moment triggered by the feeder link switch: or determining a moment that is different from the time information by a predetermined duration as the cell reselection moment triggered by the feeder link switch.

In an embodiment, step S22 includes one of the following:

in response to the network type being an earth moving type and the time information relating to a cell reselection scenario triggered by a feeder link switch, determining a cell reselection moment triggered by the feeder link switch based on the time information:

in response to the time information relating to the cell reselection scenario triggered by the feeder link switch, determining the cell reselection moment triggered by the feeder link switch based on the time information:

in response to the network type being the earth moving type, determining the cell reselection moment triggered by the feeder link switch based on the time information.

In an embodiment, the method also includes:

before the cell reselection moment determined based on the time information, determining a cell reselection triggered by the service link switch based on a cell reselection criterion.

In this way, in the embodiments of the present disclosure, when determining that the time information is related to the cell reselection triggered by the feeder link switch or the network type is the earth moving type, the UE can determine the cell reselection moment triggered by the feeder link switch based on the time information: thereby determining the cell reselection moment of the cell reselection triggered by the feeder link. In addition, the embodiment of the present disclosure can determine the cell reselection moment based on the time information and the cell reselection status. Compared with determining the cell reselection based on the signal measurement result of the serving cell, it can reduce the situation in which a relatively early cell reselection moment is obtained and the UE cannot be covered by the signal during the cell reselection process, thereby improving the success rate of cell reselection.

An embodiment of the present disclosure provides a cell reselection method, which is performed by a UE, and may include: before a cell reselection moment determined based on the time information, determining a cell reselection triggered by service link switch based on a cell reselection criterion.

In an embodiment, the cell reselection criterion may be any cell reselection criterion stipulated in the wireless communication protocol: for example, the cell reselection criterion may be the R16 cell reselection criterion or the S criterion.

Exemplarily, the UE determines that the type of the network where the UE is located is an earth moving type, and determines that the received time information only involves the cell reselection scenario triggered by the feeder link switch: then the UE determines the cell reselection moment triggered by the feeder link switch based on the time information. And before the cell reselection moment, the UE measures the neighboring cell based on the cell reselection criterion, and determines the cell reselection triggered by the service link switch based on the measurement result.

Exemplarily, the UE determines that the time information received by the UE only involves the cell reselection scenario triggered by the feeder link switch, then the UE determines the cell reselection moment triggered by the feeder link switch based on the time information. And before the cell reselection moment, the UE measures the neighboring cell based on the cell reselection criterion, and determines the cell reselection triggered by the service link switch based on the measurement result.

Exemplarily, the UE determines that the type of the network where the UE is located is an earth moving type, then the UE determines the cell reselection moment triggered by the feeder link switch based on the received time information. And before the cell reselection moment, the UE measures the neighboring cell based on the cell reselection criterion, and determines the cell reselection triggered by the service link switch based on the measurement result.

Here, if the UE completes the cell reselection triggered by the service link switch based on the cell reselection criterion before the cell reselection moment, it may not need to perform the cell reselection triggered by the feeder link switch at the cell reselection moment.

In the embodiment of the present disclosure, the UE may also determine the cell reselection triggered by the service link switch based on the cell reselection criterion before the cell reselection moment triggered by the feeder link switch; thus, before the cell reselection moment, the cell reselection triggered by service link switch can be handled; thereby improving the success rate of cell reselection.

Figure 4:
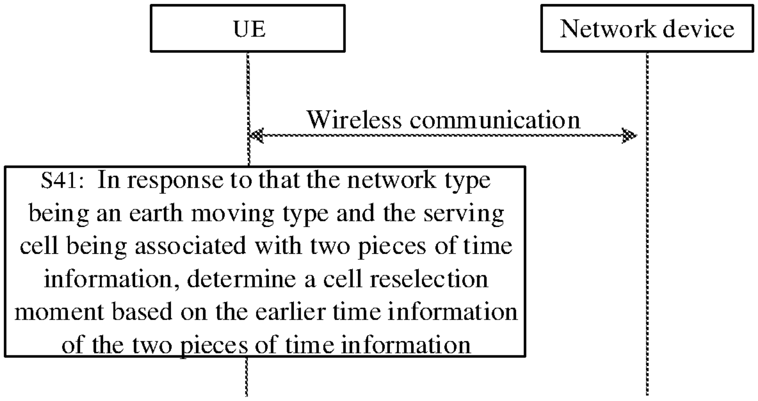
FIG. 4 is a flowchart showing a cell reselection method according to an embodiment of the present disclosure.

As shown in FIG. 4, an embodiment of the present disclosure provides a cell reselection method, which is performed by a UE, including the following steps.

In step S41: in response to that the network type is an earth moving type and the serving cell is associated with two pieces of time information, a cell reselection moment is determined based on the earlier time information of the two pieces of time information.

Exemplarily, the UE determines that the type of the network where the UE is located is an earth moving type, and the UE determines that two pieces of time information for the serving cell have been received. Among the two pieces of time information, the first time information is earlier than the second time information; then the UE determines that the first time information is the cell reselection moment. For example, if the two pieces of time information are 9:5 and 9:10, then it is determined that the adjacent cell measurement starts at 9:5.

Here, any one of the two pieces of time information may relate to a cell reselection scenario triggered by service link switch or a cell reselection scenario triggered by feeder link switch.

In an embodiment, step S22 includes:

in response to that the network type is the earth moving type and the serving cell is associated with two pieces of time information, determining the cell reselection moment based on the earlier time information of the two pieces of time information.

In the embodiment of the present disclosure, if the network type is the earth moving type and the serving cell is associated with two pieces of time information, no matter what application scenario the two pieces of time information relate to; the UE can determine the cell reselection moment based on the earlier time information. In this way, the embodiments of the present disclosure can perform reselection at a relatively early time, so that the UE can be connected to the cell for communication earlier: in this way, the occurrence of link disconnection of the UE can be reduced, and the stability of the communication connection of the UE can be improved.

Figure 5:
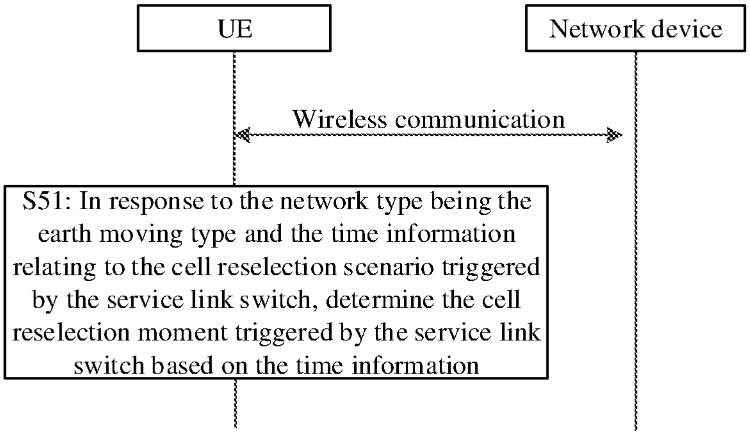
FIG. 5 is a flowchart showing a cell reselection method according to an embodiment of the present disclosure.

As shown in FIG. 5, an embodiment of the present disclosure provides a cell reselection method, which is performed by a UE, including the following steps.

In step S51: in response to the network type being the earth moving type and the time information relating to the cell reselection scenario triggered by the service link switch, the cell reselection moment triggered by the service link switch is determined based on the time information.

Exemplarily, the UE determines that the type of the network where the UE is located is an earth moving type, and the UE determines that the time information involves an application scenario of the service link switch. Then the UE determines that the time information is the cell reselection moment triggered by the feeder link switch. Then the UE starts to perform a cell reselection operation at the cell reselection moment, such as performing measurement of the neighboring cell.

In an embodiment, step S22 includes:

in response to the network type being an earth moving type and the time information relating to the cell reselection scenario triggered by the service link switch, determining the cell reselection moment triggered by the service link switch based on the time information.

In this way, in the embodiments of the present disclosure, when the network type is the earth moving type, the cell reselection triggered by the service link switch can be determined based on the time information related to the cell reselection scenario triggered by the service link switch; in this way, the cell reselection moment of the cell reselection triggered by service link switch can be determined. In addition, compared with the determination of cell reselection based on the signal measurement result of the serving cell in the related art, the embodiment of the present disclosure can reduce the situation of obtaining a relatively early cell reselection moment and the failure to make the signal cover the UE during the cell reselection process, and improve the success rate of cell reselection.

It should be noted that those skilled in the art can understand that the methods provided in the embodiments of the present disclosure may be executed independently, or together with some methods in the embodiments of the present disclosure or some methods in the related art.

Figure 6:
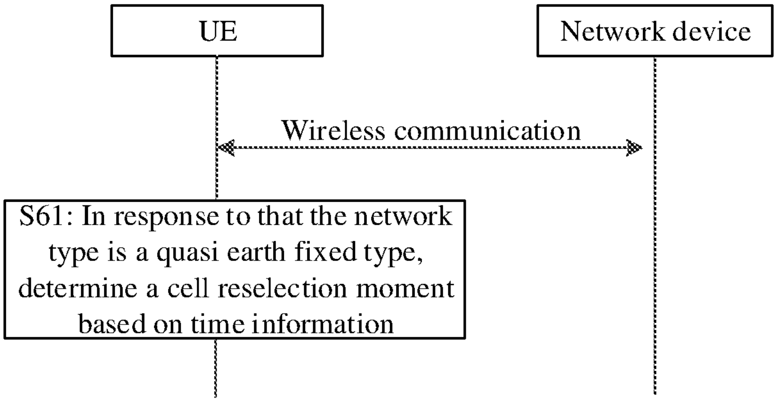
FIG. 6 is a flowchart showing a cell reselection method according to an embodiment of the present disclosure.

As shown in FIG. 6, an embodiment of the present disclosure provides a cell reselection method, which is performed by a UE, including the following steps.

In step S61: in response to that the network type is a quasi earth fixed type, a cell reselection moment is determined based on time information.

Exemplarily, the UE determines that the type of the network where the UE is located is a quasi earth fixed type, and then the UE determines the cell reselection moment based on the received time information. If the time information involves a cell reselection scenario triggered by service link switch, the UE determines the cell reselection moment triggered by service link switch based on the time information: if the time information involves a cell reselection scenario triggered by feeder link switch, then the UE determines the cell reselection moment triggered by the feeder link switch based on the time information.

In an embodiment, step S22 includes:

in response to the network type being the quasi earth fixed type, determining the cell reselection moment based on the time information.

In the embodiment of the present disclosure, when the type of the network where the UE is located is the quasi earth fixed type, the cell reselection moment can be determined based on the time information: in this way, compared with determining the cell reselection moment by the received time information from the network device, the cell reselection can be performed at an earlier time, so that the occurrence of disconnection of UE link can be reduced and the stability of UE communication connection can be improved.

It should be noted that those skilled in the art can understand that the methods provided in the embodiments of the present disclosure may be executed independently, or together with some methods in the embodiments of the present disclosure or some methods in the related art.

The following cell reselection method is performed by the network device, which is similar to the above description of the cell reselection method performed by the UE; and, for the technical details not disclosed in the embodiment of the cell reselection method performed by the network device, the description of the example of the cell reselection method performed by the UE is referred to, and no detailed description will be given here.

Figure 7:
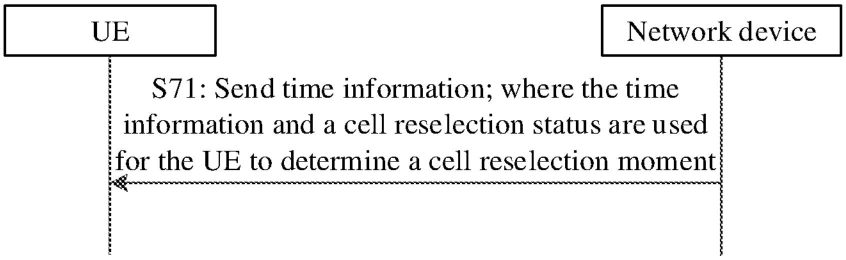
FIG. 7 is a flowchart showing a cell reselection method according to an embodiment of the present disclosure.

As shown in FIG. 7, an embodiment of the present disclosure provides a cell reselection method, which is performed by a network device, including the following steps.

In step S71: time information is sent: where the time information and a cell reselection status are used for the UE to determine a cell reselection moment.

In an embodiment, the cell reselection status includes at least one of the following:

a network type: or an application scenario involved in the time information.

In an embodiment, the network type includes one of the following:

an earth moving type, indicating a type of NTN network where an area covered by a satellite beam on the earth moves:

an earth fixed type, indicating a type of NTN network where the area covered by the satellite beam on the earth is fixed:

a quasi earth fixed type, indicating a type of NTN network where a first area covered by the satellite beam on the earth is fixed within a predetermined time, and the satellite beam covers a second area on the earth when the predetermined time is reached.

In an embodiment, the application scenario includes one of the following:

a cell reselection scenario triggered by a service link switch;

a cell reselection scenario triggered by a feeder link switch.

In an embodiment, the network type and/or application scenario is determined based on a field of a first message carrying the time information.

In an embodiment, when the time information is carried in different fields of the first message, it indicates that the network types are different and/or the application scenarios related to the time information are different.

An embodiment of the present disclosure provides a cell reselection method, which is performed by a network device, and may include: sending a first message; where the first message carries the time information: different fields of the first message carry the time information, indicating different network types and/or application scenarios relating to different time information.

An embodiment of the present disclosure provides a cell reselection method, which is performed by a network device, and may include: sending a first message, where a first predetermined field of the first message carries the time information, indicating that the network type is an earth moving type and/or indicating that the time information relates to a cell reselection scenario triggered by feeder link switch.

An embodiment of the present disclosure provides a cell reselection method, which is performed by a network device, and may include: sending a first message, where a second predetermined field of the first message carries the time information, indicating that the network type is a quasi earth fixed type and/or indicating that the time information relates to the cell reselection scenario triggered by service link switch.

An embodiment of the present disclosure provides a cell reselection method, which is performed by a network device, and may include: sending indication information, where the indication information is used to indicate a network type and/or an application scenario.

In an embodiment, the indication information includes type indication information; where the type indication information includes one of the following:

first type indication information used to indicate that the network type is an earth moving type:

second type indication information used to indicate that the network type is an earth fixed type:

third type indication information used to indicate that the network type is a quasi earth fixed type.

In an embodiment, the indication information includes switch indication information: where the switch indication information includes one of the following:

first switch indication information used to indicate that the time information relates to a cell reselection scenario triggered by a service link switch;

second switch indication information used to indicate that the time information relates to a cell reselection scenario triggered by a feeder link switch.

In an embodiment, if the indication information does not include the switch indication information, the time information relates to a cell reselection scenario triggered by service link switch and a cell reselection scenario triggered by feeder link switch.

In an embodiment, if the serving cell of the UE is of earth moving type, one serving cell is associated with one or two pieces of the time information.

In an embodiment, if one serving cell is associated with two pieces of time information, one piece of the time information relates to a cell reselection scenario triggered by service link switch, and the other piece of the time information relates to a cell reselection scenario triggered by feeder link switch.

In an embodiment, if the serving cell of the UE is a quasi earth fixed type, one serving cell is associated with one piece of time information.

It should be noted that those skilled in the art can understand that the methods provided in the embodiments of the present disclosure may be executed independently, or together with some methods in the embodiments of the present disclosure or some methods in the related art.

Figure 8:
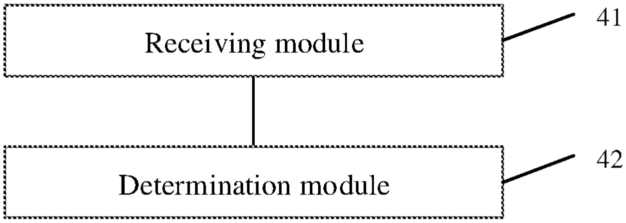
FIG. 8 is a block diagram showing a cell reselection apparatus according to an embodiment of the present disclosure.

As shown in FIG. 8, a cell reselection apparatus is provided, which is applied to a UE, including:

a receiving module 41, configured to receive time information;

a determination module 42, configured to determine a cell reselection moment according to the time information and a cell reselection status.

In an embodiment, the cell reselection status includes at least one of the following:

a network type: or an application scenario involved in the time information.

In an embodiment, the network type includes one of the following:

an earth moving type, indicating a type of NTN network where an area covered by a satellite beam on the earth moves:

an earth fixed type, indicating a type of NTN network where the area covered by the satellite beam on the earth is fixed:

a quasi earth fixed type, indicating a type of NTN network where a first area covered by the satellite beam on the earth is fixed within a predetermined time, and the satellite beam covers a second area on the earth when the predetermined time is reached.

In an embodiment, the application scenario includes one of the following:

a cell reselection scenario triggered by a service link switch:

a cell reselection scenario triggered by a feeder link switch.

An embodiment of the present disclosure provides a cell reselection apparatus, which is applied to a UE, and may include: a determination module 42 configured to determine a cell reselection moment according to time information and a network type.

An embodiment of the present disclosure provides a cell reselection apparatus, which is applied to a UE, and may include: a determination module 42 configured to determine a cell reselection moment according to the time information and an application scenario involved in the time information.

An embodiment of the present disclosure provides a cell reselection apparatus, which is applied to a UE, and may include: a determination module 42 configured to determine a cell reselection moment according to the time information, a network type, and an application scenario involved in the time information.

In an embodiment, the network type and/or application scenario is determined based on a field of a first message carrying the time information;

or, the network type and/or application scenario is determined based on received indication information.

In an embodiment, when the time information is carried in different fields of the first message, it indicates that the network types are different and/or the application scenarios related to the time information are different.

In an embodiment, when the time information is carried in the first predetermined field of the first message, it indicates that the network type is an earth moving type.

In an embodiment, when the time information is carried in the second predetermined field of the first message, it indicates that the network type is a quasi earth fixed type.

In an embodiment, when the time information is carried in the first predetermined field of the first message, it indicates that the time information involves a cell reselection scenario triggered by feeder link switch.

In an embodiment, when the time information is carried in the second predetermined field of the first message, it indicates that the time information involves a cell reselection scenario triggered by service link switch.

In an embodiment, the indication information includes type indication information; where the type indication information includes one of the following:

first type indication information used to indicate that the network type is an earth moving type:

second type indication information used to indicate that the network type is an earth fixed type:

third type indication information used to indicate that the network type is a quasi earth fixed type.

In an embodiment, the indication information includes switch indication information: where the switch indication information includes one of the following:

first switch indication information used to indicate that the time information relates to a cell reselection scenario triggered by a service link switch;

second switch indication information used to indicate that the time information relates to a cell reselection scenario triggered by a feeder link switch.

In an embodiment, if the indication information does not include the switch indication information, the time information relates to a cell reselection scenario triggered by service link switch and a cell reselection scenario triggered by feeder link switch.

In an embodiment, if the serving cell of the UE is of earth moving type, one serving cell is associated with one or two pieces of the time information.

In an embodiment, if one serving cell is associated with two pieces of time information, one piece of the time information relates to a cell reselection scenario triggered by service link switch, and the other piece of the time information relates to a cell reselection scenario triggered by feeder link switch.

In an embodiment, if the serving cell of the UE is a quasi earth fixed type, one serving cell is associated with one piece of time information.

An embodiment of the present disclosure provides a cell reselection apparatus, which is applied to a UE, and may include: a determination module 42 configured to, in response to the network type being an earth moving type and the time information involving a cell reselection scenario triggered by a feeder link switch, determine the cell reselection moment triggered by the feeder link switch based on the time information.

An embodiment of the present disclosure provides a cell reselection apparatus, which is applied to a UE, and may include: a determination module 42 configured to, in response to the time information involving a cell reselection scenario triggered by feeder link switch, determine the cell reselection moment triggered by the feeder link switch based on the time information.

An embodiment of the present disclosure provides a cell reselection apparatus, which is applied to a UE, and may include: a determination module 42 configured to, in response to the network type being an earth moving type, determine a cell reselection moment triggered by feeder link switch based on the time information.

An embodiment of the present disclosure provides a cell reselection apparatus, which is applied to a UE, and may include: a determination module 42 configured to determine a cell reselection triggered by the service link switch based on a cell reselection criterion before the cell reselection moment determined based on the time information.

An embodiment of the present disclosure provides a cell reselection apparatus, which is applied to a UE, and may include: a determination module 42 configured to, in response to the network type being the earth moving type and the serving cell being associated with two pieces of time information, determine the cell reselection moment based on the earlier time information in the two pieces of time information.

An embodiment of the present disclosure provides a cell reselection apparatus, which is applied to a UE, and may include: a determination module 42 configured to, in response to the network type being an earth moving type and the time information involving a cell reselection scenario triggered by the service link switch, determine the cell reselection moment triggered by the service link switch based on the time information.

An embodiment of the present disclosure provides a cell reselection apparatus, which is applied to a UE, and may include: a determination module configured to determine a cell reselection moment based on the time information in response to the network type being a quasi earth fixed type.

In an embodiment, the time information is time information of Coordinated Universal Time.

It should be noted that those skilled in the art can understand that the apparatuses provided in the embodiments of the present disclosure may be implemented independently, or together with some apparatuses in the embodiments of the present disclosure or some apparatuses in the related art.

Regarding the apparatuses in the foregoing embodiments, the specific manner in which each module executes operations has been described in detail in the embodiments related to the method, and will not be described in detail here.

Figure 9:
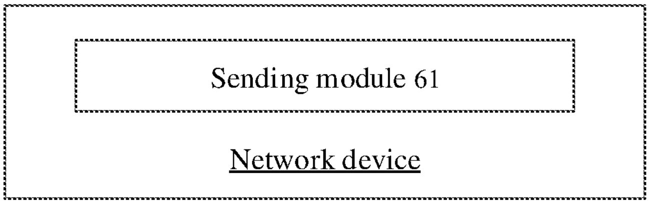
FIG. 9 is a block diagram showing a cell reselection apparatus according to an embodiment of the present disclosure.

As shown in FIG. 9, a cell reselection apparatus is provided, which is applied to a network device, including:

a sending module 61, configured to send time information: where the time information and a cell reselection status are used for a UE to determine a cell reselection moment.

In an embodiment, the cell reselection status includes at least one of the following:

a network type: or an application scenarios involved in the time information.

In an embodiment, the network type includes one of the following:

an earth moving type, indicating a type of NTN network where an area covered by a satellite beam on the earth moves;

an earth fixed type, indicating a type of NTN network where the area covered by the satellite beam on the earth is fixed;

a quasi earth fixed type, indicating a type of NTN network where a first area covered by the satellite beam on the earth is fixed within a predetermined time, and the satellite beam covers a second area on the earth when the predetermined time is reached.

In an embodiment, the application scenario includes one of the following:

a cell reselection scenario triggered by a service link switch;

a cell reselection scenario triggered by a feeder link switch.

In an embodiment, the network type and/or application scenario is determined based on a field of a first message carrying the time information;

or, the sending module is configured to send indication information, where the indication information is used to indicate the network type and/or application scenario.

In an embodiment, when the time information is carried in different fields of the first message, it indicates that the network types are different and/or the application scenarios related to the time information are different.

In an embodiment, when the time information is carried in the first predetermined field of the first message, it indicates that the network type is an earth moving type.

In an embodiment, when the time information is carried in the second predetermined field of the first message, it indicates that the network type is a quasi earth fixed type.

In an embodiment, when the time information is carried in the first predetermined field of the first message, it indicates that the time information involves a cell reselection scenario triggered by feeder link switch.

In an embodiment, when the time information is carried in the second predetermined field of the first message, it indicates that the time information involves a cell reselection scenario triggered by service link switch.

In an embodiment, the indication information includes type indication information: where the type indication information includes one of the following:

first type indication information used to indicate that the network type is an earth moving type:

second type indication information used to indicate that the network type is an earth fixed type:

third type indication information used to indicate that the network type is a quasi earth fixed type.

In an embodiment, the indication information includes switch indication information: where the switch indication information includes one of the following:

first switch indication information used to indicate that the time information relates to a cell reselection scenario triggered by a service link switch;

second switch indication information used to indicate that the time information relates to a cell reselection scenario triggered by a feeder link switch.

In an embodiment, if the indication information does not include the switch indication information, the time information relates to a cell reselection scenario triggered by service link switch and a cell reselection scenario triggered by feeder link switch.

In an embodiment, if the serving cell of the UE is of earth moving type, one serving cell is associated with one or two pieces of the time information.

In an embodiment, if one serving cell is associated with two pieces of time information, one piece of the time information relates to a cell reselection scenario triggered by service link switch, and the other piece of the time information relates to a cell reselection scenario triggered by feeder link switch.

In an embodiment, if the serving cell of the UE is a quasi earth fixed type, one serving cell is associated with one piece of time information.

It should be noted that those skilled in the art can understand that the apparatuses provided in the embodiments of the present disclosure may be implemented independently, or together with some apparatuses in the embodiments of the present disclosure or some apparatuses in the related art.

Regarding the apparatuses in the foregoing embodiments, the specific manner in which each module executes operations has been described in detail in the embodiments related to the method, and will not be described in detail here.

An embodiment of the present disclosure provides a communication device, including:

a processor:

a memory for storing executable instructions of the processor;

where the processor is configured to implement the cell reselection method in any embodiment of the present disclosure when running the executable instructions.

In an embodiment, the communication device may be a network device or a UE. Exemplarily, the network device may be a base station or a core network device. Exemplarily, the network device may be an NTN network device The processor may include various types of storage media, which are non-transitory computer storage media, and can continue to memorize and store information thereon after the user equipment is powered off.

The processor may be connected to the memory through a bus or the like, and is used to read the executable program stored on the memory, for example, at least one of the methods shown in FIGS. 2 to 7.

An embodiment of the present disclosure further provides a computer storage medium, where a computer executable program is stored in the computer storage medium, and when the executable program is executed by a processor, the cell reselection method in any embodiment of the present disclosure is implemented, for example, at least one of the methods shown in FIG. 2 to FIG. 7.

Regarding the apparatuses in the above embodiments, the specific manners in which each module executes operations have been described in detail in the embodiments related to the method, and will not be described in detail here.

Figure 10:
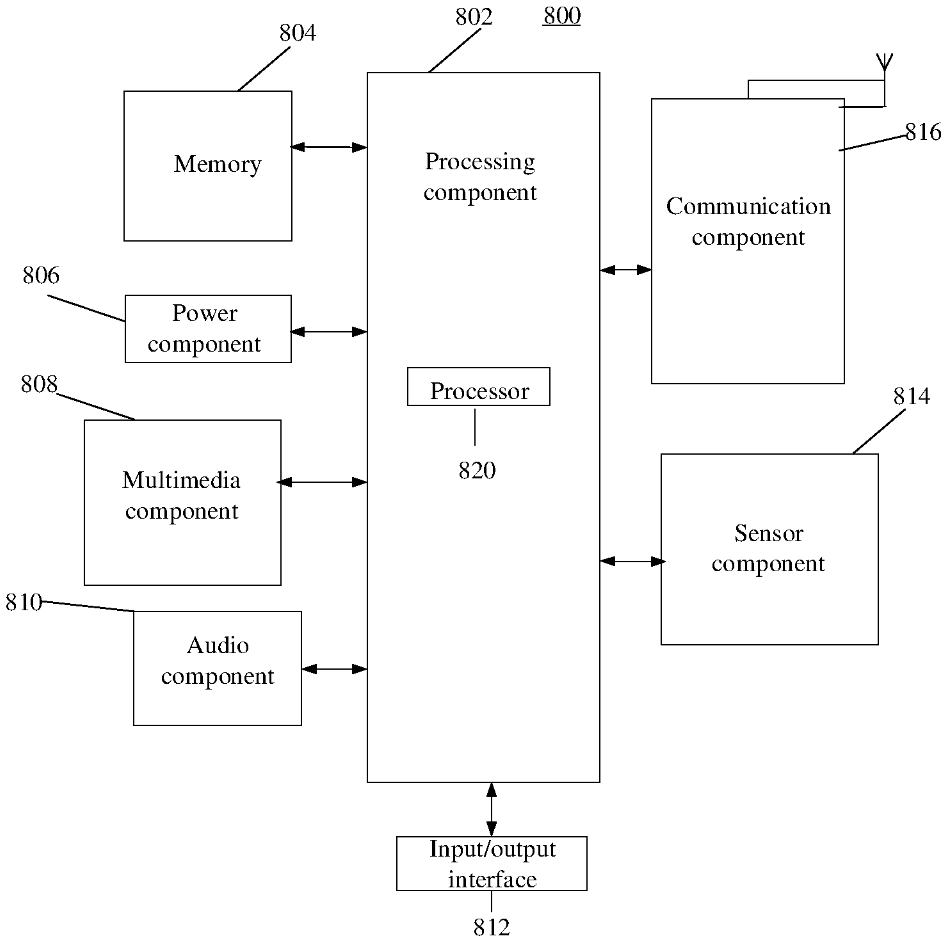
FIG. 10 is a block diagram of a UE according to an embodiment.

FIG. 10 is a block diagram of a user equipment 800 according to an embodiment. For example, the user equipment 800 may be a mobile phone, a computer, a digital broadcast terminal, a messaging device, a gaming console, a tablet, a medical device, exercise equipment, a personal digital assistant, and the like.

Referring to FIG. 10, the user equipment 800 may include one or more of the following components: a processing component 802, a memory 804, a power component 806, a multimedia component 808, an audio component 810, an input/output (I/O) interface 812, a sensor component 814, and a communication component 816.

The processing component 802 typically controlsll operations of the user equipment 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the user equipment 800. Examples of such data include instructions for any applications or methods operated on the user equipment 800, contact data, phonebook data, messages, pictures, video, etc. The memory 804 may be implemented by using any type of volatile or non-volatile memory devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the user equipment 800. The power component 806 may include a power management system, one or more power sources, and any other components associated with the generation, management, and distribution of power in the user equipment 800.

The multimedia component 808 includes a screen providing an output interface between the user equipment 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the user equipment 800 is in an operation mode, such as a photographing mode or a video mode. Each of the front camera and rear camera may be a fixed optical lens system or have focus and optical zoom capability.

The audio component 810 is configured to output and/or input audio signals. For example, the audio component 810 includes a microphone (MIC) configured to receive an external audio signal when the user equipment 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the user equipment 800. For instance, the sensor component 814 may detect an open/closed state of the user equipment 800, relative positioning of components, e.g., the display and keypad, of the user equipment 800, a change in location of the user equipment 800 or a component of the user equipment 800, a presence or absence of user contact with the user equipment 800, an orientation or an acceleration/deceleration of the user equipment 800, and a change in temperature of the user equipment 800. The sensor assembly 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the user equipment 800 and other devices. The user equipment 800 can access a wireless network based on a communication standard, such as WiFi, 2G, or 3G, or a combination thereof. In one embodiment, the communication component 816 receives a broadcast signal or broadcast associated information from an external broadcast management system via a broadcast channel. In one embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an embodiment, the user equipment 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In an embodiment, there is also provided a non-transitory computer-readable storage medium including instructions, such as the memory 804 including instructions, and the above instructions can be executed by the processor 820 of the user equipment 800 to implement the above described methods. For example, the non-transitory computer readable storage medium may be a ROM, a random access memory (RAM), a CD-ROM, a magnetic tape, a floppy disk, an optical data storage device, and the like.

Figure 11:
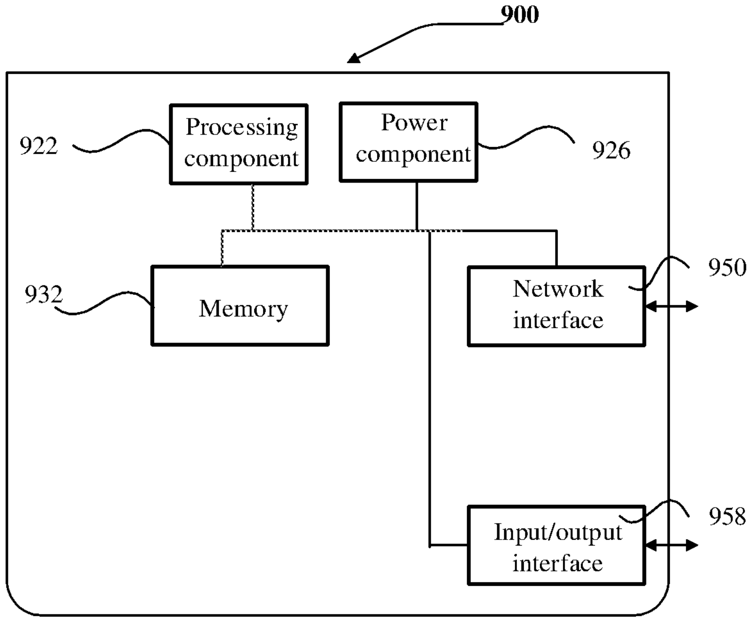
FIG. 11 is a block diagram of a base station according to an embodiment.

As shown in FIG. 11, an embodiment of the present disclosure illustrates a structure of a base station. For example, the base station 900 may be provided as a network side device. Referring to FIG. 11, the base station 900 includes a processing component 922, which further includes one or more processors, and a memory resource represented by a memory 932 for storing instructions executable by the processing component 922, such as application programs. The application programs stored in the memory 932 may include one or more modules each corresponding to a set of instructions. In addition, the processing component 922 is configured to execute the instructions to perform any of the above described methods applied in the base station, for example, the methods shown in FIGS. 4 to 10.

The base station 900 may also include a power component 926 configured to perform power management of the base station 900, a wired or wireless network interface 950 configured to connect the base station 900 to a network, and an input-output (I/O) interface 958. The base station 900 can operate based on an operating system stored in the memory 932, such as Windows Server™, Mac OS X™, Unix™, Linux™, FreeBSD™ or the like.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including the common general knowledge or habitual technical means in the technical field not disclosed in the present disclosure. The specification and the embodiments are considered as exemplary only, and a true scope and spirit of the present disclosure is indicated by the appending claims.

It will be appreciated that the present disclosure is not limited to the exact construction that has been described above and illustrated in the accompanying drawings, and that various modifications and changes may be made without departing from the scope thereof. It is intended that the scope of the present disclosure is only limited by the appended claims.

What is claimed is:

1. A cell reselection method, performed by a user equipment (UE), comprising:

receiving a first message, wherein the first message carries time information; and determining a cell reselection moment according to the time information and a cell reselection status, wherein the cell reselection status comprises an application scenario involved in the time information, and a network type; the application scenario comprises a cell reselection scenario triggered by a service link switch, and a cell reselection scenario triggered by a feeder link switch; and the network type only comprises an earth moving type or a quasi earth fixed type;

wherein a serving cell of the UE is the earth moving type, and the time information only relates to the cell reselection scenario triggered by the feeder link switch; or the serving cell of the UE is the quasi earth fixed type, and the time information relates to the cell reselection scenario triggered by the service link switch or the cell reselection scenario triggered by the feeder link switch.

2. The method according to claim 1, wherein the earth moving type indicates a type of NTN Non-terrestrial networks network where an area covered by a satellite beam on the earth moves; or the quasi earth fixed type indicates a type of NTN network where a first area covered by the satellite beam on the earth is fixed within a predetermined time, and the satellite beam covers a second area on the earth when the predetermined time is reached.

3. The method according to claim 1, wherein at least one of the network type or the application scenario is determined based on one of a field of the received first message or received indication information.

4. The method according to claim 3, wherein the time information being carried in different fields of the first message indicates at least one of the network type being different or the application scenario involved in the time information being different.

5. The method according to claim 4, wherein a first predetermined field of the first message carries the time information, indicating at least one of: the network type being the earth moving type, or the time information relating to the cell reselection scenario triggered by the feeder link switch;

a second predetermined field of the first message carries the time information, indicating at least one of: the network type being the quasi earth fixed type, or the time information relating to the cell reselection scenario triggered by the service link switch.

6. The method according to claim 3, wherein the indication information comprises type indication information; wherein the type indication information comprises one of:

first type indication information to indicate that the network type is the earth moving type; or third type indication information to indicate that the network type is the quasi earth fixed type.

7. The method according to claim 3, wherein the indication information comprises switch indication information; wherein the switch indication information comprises one of:

first switch indication information to indicate that the time information relates to the cell reselection scenario triggered by the service link switch; or second switch indication information to indicate that the time information relates to the cell reselection scenario triggered by the feeder link switch.

8. The method according to claim 7, wherein the indication information does not comprise the switch indication information, and the time information relates to the cell reselection scenario triggered by the service link switch and the cell reselection scenario triggered by the feeder link switch.

9. The method according to claim 1, wherein the serving cell of the UE is the earth moving type, and one serving cell is associated with one or two pieces of the time information.

10. The method according to claim 9, wherein determining the cell reselection moment according to the time information and the cell reselection status comprises:

the network type being the earth moving type and the serving cell being associated with two pieces of the time information, determining the cell reselection moment based on an earlier piece of time information of the two pieces of the time information.

11. The method according to claim 1, wherein the serving cell of the UE is the quasi earth fixed type, and one serving cell is associated with one piece of the time information.

12. The method according to claim 1, wherein determining the cell reselection moment according to the time information and the cell reselection status comprises one of:

the network type being the earth moving type and the time information relating to the cell reselection scenario triggered by the feeder link switch, determining the cell reselection moment triggered by the feeder link switch based on the time information;

the time information relating to the cell reselection scenario triggered by the feeder link switch, determining the cell reselection moment triggered by the feeder link switch based on the time information; or the network type being the earth moving type, determining the cell reselection moment triggered by the feeder link switch based on the time information.

13. The method according to claim 12, further comprising:

before the cell reselection moment determined based on the time information, determining a cell reselection triggered by the service link switch based on a cell reselection criterion.

14. The method according to claim 13, wherein the UE completes the cell reselection triggered by the service link switch based on the cell reselection criterion before the cell reselection moment, and the UE does not need to perform the cell reselection triggered by the feeder link switch at the cell reselection moment.

15. The method according to claim 1, wherein the time information is time information of Coordinated Universal Time.

16. The method according to claim 1, wherein the time information is used by all UEs in the serving cell of the UE for determining the cell reselection moment.

17. A cell reselection method, performed by a network device, comprising:

sending a first message, wherein the first message carries time information; wherein the time information and a cell reselection status are configured for a user equipment (UE) to determine a cell reselection moment;

wherein the cell reselection status comprises an application scenario involved in the time information, and a network type; the application scenario comprises a cell reselection scenario triggered by a service link switch, and a cell reselection scenario triggered by a feeder link switch; and the network type only comprises an earth moving type or a quasi earth fixed type;

wherein a serving cell of the UE is the earth moving type, and the time information only relates to the cell reselection scenario triggered by the feeder link switch; or the serving cell of the UE is the quasi earth fixed type, and the time information relates to the cell reselection scenario triggered by the service link switch or the cell reselection scenario triggered by the feeder link switch.

18. The method according to claim 17, wherein the earth moving type indicates a type of NTN network where an area covered by a satellite beam on the earth moves; or the quasi earth fixed type indicates a type of NTN network where a first area covered by the satellite beam on the earth is fixed within a predetermined time, and the satellite beam covers a second area on the earth when the predetermined time is reached.

19. The method according to claim 17, wherein at least one of the network type or the application scenario is determined based on one of a field of the first message carrying the time information or indication information.

20. The method according to claim 19, wherein the time information being carried in different fields of the first message indicates at least one of the network type being different or the application scenario involved in the time information being different.

21. The method according to claim 20, wherein a first predetermined field of the first message carries the time information, indicating at least one of: the network type being the earth moving type, or the time information relating to the cell reselection scenario triggered by the feeder link switch;

a second predetermined field of the first message carries the time information, indicating at least one of: the network type being the quasi earth fixed type, or the time information relating to the cell reselection scenario triggered by the service link switch.

22. The method according to claim 19, wherein the indication information comprises type indication information; wherein the type indication information comprises one of:

first type indication information to indicate that the network type is the earth moving type; or third type indication information to indicate that the network type is the quasi earth fixed type.

23. The method according to claim 19, wherein the indication information comprises switch indication information; wherein the switch indication information comprises one of:

first switch indication information used to indicate that the time information relates to the cell reselection scenario triggered by the service link switch; or second switch indication information used to indicate that the time information relates to the cell reselection scenario triggered by the feeder link switch.

24. The method according to claim 23, wherein the indication information does not comprise the switch indication information, and the time information relates to the cell reselection scenario triggered by the service link switch and the cell reselection scenario triggered by the feeder link switch.

25. The method according to claim 17, wherein the serving cell of the UE is the earth moving type, and one serving cell is associated with one or two pieces of the time information.

26. The method according to claim 17, wherein the serving cell of the UE is the quasi earth fixed type, and one serving cell is associated with one piece of the time information.

27. The method according to claim 17, wherein the time information is used by all UEs in the serving cell of the UE for determining the cell reselection moment.

28. A user equipment (UE), comprising:

a processor; and a memory storing instructions executable by the processor, wherein the processor is configured to:

receive a first message, wherein the first message carries time information; and determine a cell reselection moment according to the time information and a cell reselection status, wherein the cell reselection status comprises an application scenario involved in the time information, and a network type; the application scenario comprises a cell reselection scenario triggered by a service link switch, and a cell reselection scenario triggered by a feeder link switch; and the network type only comprises an earth moving type or a quasi earth fixed type;

wherein a serving cell of the UE is the earth moving type, and the time information only relates to the cell reselection scenario triggered by the feeder link switch; or the serving cell of the UE is the quasi earth fixed type, and the time information relates to the cell reselection scenario triggered by the service link switch or the cell reselection scenario triggered by the feeder link switch.

* * * * *